United States Patent [19]
Dähler et al.

[11] Patent Number: 5,204,548
[45] Date of Patent: Apr. 20, 1993

[54] ENERGY STORAGE CIRCUIT WITH DC CHOPPER SUPERCONDUCTING REACTOR

[75] Inventors: Peter Dähler, Remigen, Switzerland; Michael Häusler, Weilheim, Fed. Rep. of Germany

[73] Assignee: Asea Brown Boveri Ltd., Baden, Switzerland

[21] Appl. No.: 682,237

[22] Filed: Apr. 9, 1991

[30] Foreign Application Priority Data

May 8, 1990 [CH] Switzerland ............... 1790/90-1

[51] Int. Cl.$^5$ .......................... H02J 9/00; H02J 15/00
[52] U.S. Cl. ........................................ 307/66; 362/14; 362/36
[58] Field of Search .................... 363/13, 36, 37, 14; 307/66; 323/360

[56] References Cited

U.S. PATENT DOCUMENTS

| 4,079,305 | 3/1978 | Peterson et al. | 363/14 |
| 4,599,519 | 7/1986 | Boenig | 307/66 |
| 4,695,932 | 9/1987 | Higashino | 363/14 |

FOREIGN PATENT DOCUMENTS

| 0088445 | 9/1986 | European Pat. Off. | |
| 1964755 | 7/1970 | Fed. Rep. of Germany | |
| 1438545 | 6/1976 | United Kingdom | 363/65 |

OTHER PUBLICATIONS

"Application of Superconducting Magnet Energy Storage, etc.", Mitani, et al., IEEE Transactions on Power Systems, vol. 3, No. 4, Nov. 1988, pp. 1418-1425.

"Stabilization of the Energy of an Accelerator Tank Circuit", Furman, Scientific-Research Institute, No. 5, Sep.-Oct. 1971, pp. 1297-1299.

Primary Examiner—William H. Beha, Jr.
Attorney, Agent, or Firm—Burns, Doane, Swecker & Mathis

[57] ABSTRACT

A two-quadrant converter having a connected superconducting magnetic memory used as a chopper circuit or an actuator for stabilizing networks and for short-term bridging of power failures (e.g., uninterrupted power supply). For example, a two-quadrant converter is connected on the input side to an intermediate d.c. circuit of a converter whose intermediate circuit voltage is stabilized by an indirect capacitor. A magnetic memory is charged and discharged, respectively with energy in cyclic intervals, i.e. in conjunction with interposed free-wheeling intervals. Charging takes place via triggered thyristors, discharging via conducting diodes, with blocked thyristors. When the magnetic memory is in a charged state and is to be neither charged nor discharged over lengthy intervals, its current can be conducted in the free wheel via a closed mechanical switch connected in parallel.

11 Claims, 3 Drawing Sheets

ENERGY STORAGE CIRCUIT WITH DC CHOPPER SUPERCONDUCTING REACTOR

BACKGROUND OF THE INVENTION

1. Field of the Invention

The invention proceeds from a two-quadrant converter according to the preamble of Patent claims 1-3.

2. Discussion of Background

The preamble of the invention refers to a prior art such as is disclosed in EP-A1-0,088,445. There, bridge circuits each having two diodes and two GTO thyristors in the bridge arms provided for the purpose of transmitting energy from and to a reactor, and of transmitting energy via a capacitor to another reactor. The free-wheeling current through one reactor can be controlled alternately by two different bridge arms, so that a reduced switching rate of the semiconductor valves results.

It is known from DE-A-1,964,755 to provide a diode or a switch in parallel with a superconducting coil for the purpose of feeding in, storing and maintaining an electric current in a superconductor circuit.

It is known from Instruments and Experimental Techniques, Vol. 24, No. 5¹, September/October 1971, New York/U.S., E. G. Furman: "Stabilisation of the energy of an accelerator tank circuit", pages 1297 to 1299, to use a two-quadrant converter to excite the magnet of a Betatron, energy being supplied in pulses from a non-stabilised network via a saturable reactor. Feedback into the network of the energy stored in the magnet is prevented by a network-side voltage stabilizing circuit which has a thyristor in series with a reactor. Measures for reducing the switching rate of the semiconductor valves of the two-quadrant converter are not specified.

Additional reference concerning the relevant prior art may be made to IEEE Transactions on Power Systems, Vol. 3, No. 4, November 1988, pages 1418 to 1425. There, two six-pulse converters are connected in series in a Graetz bridge circuit via a superconducting magnet in order to stabilise a network with respect to its active power and reactive power. In this case, the semiconductor valves of the converters need to be overrated in terms of power.

SUMMARY OF THE INVENTION

Accordingly, one object of this invention, as defined in Patent claims 1 to 3, is to provide novel circuits of two-quadrant converters which permit the semiconductor valves used to be loaded at a lower level in terms of power.

One advantage of the invention consists in that a proportion of the semiconductor valves can be designed for a lower electrical power.

In accordance with one embodiment of the invention, the number of the semiconductor valves of the two-quadrant converter can be reduced to two.

A controllable valve connected in parallel to the magnetic memory permits further unloading of the semiconductor valves of the two-quadrant converter in operating states in which the magnetic memory need be neither charged nor discharged.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
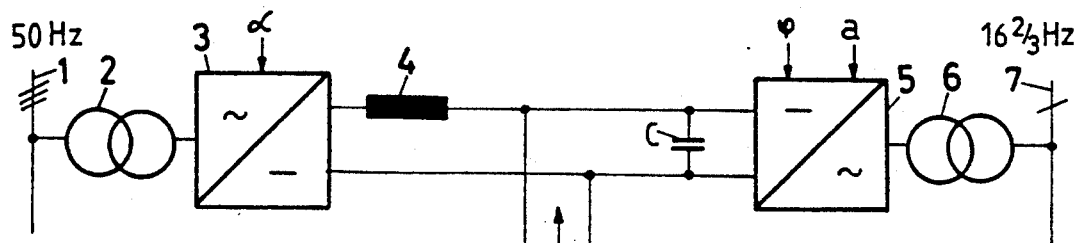
FIG. 1 shows an all-electronic back-to-back link of 2 networks, having a converter to the intermediate d.c. circuit of which a two-quadrant converter is connected as the actuator of a superconducting magnetic memory.

Referring now to the drawings, wherein like reference numerals designate identical or corresponding parts throughout the several views, FIG. 1 shows as an example of a network interconnection the connection of a three-phase 50 Hz national grid (1) having a single-phase 16⅔ Hz-traction system (7) as all-electronic "back-to-back link". The two networks (1) and (7) are connected to one another via a national grid transformer (2) a link-commutated converter or I-converter (3), an intermediate d.c. circuit which has an indirect reactor (4) and an indirect capacitor (C), a self-commutated converter or U-converter (5), and a traction transformer (6).

The line-commutated converter (3) is constructed as a conventional, antiparallel thyristor converter. Its manipulated variable, the ignition angle ($\alpha$), is used in normal operation for the stabilisation of the intermediate circuit voltage ($U_d$) and thus indirectly for the balancing of the active power distribution in the intermediate circuit. The self-commutated converter (5) is constructed using GTO thyristors. Account can be taken of the active power requirements and reactive power requirements of the traction system (7) independently of one another with the aid of the two manipulated variables of the self-commutated converter, a phase angle ($\phi$) and an amplitude manipulated variable (a). A superconducting reactor or a magnetic memory (L), at which a voltage ($U_L$) drops and through which a magnetic memory current ($I_L$) flows, is connected to the intermediate d.c. circuit via an actuator or a two-quadrant converter (8). The coil (L) for storing energy of, for example, 1 MWh can have, as a solenoid, a height of 3 m in conjunction with a diameter of approx. 8.9 m. ($I_8$) denotes a charging current or discharging current through the two-quadrant converter (8).

Thanks to very rapid controlability, such a supplement to the network interconnection is attended by the following advantages:

Unloading of the partner network before power fluctuations (here in the traction system (7) in the range from minutes to hours), Bridging of the power transmission in the event of short-term failure of one of the two networks (1) and (7), Cushioning of the load surge for the healthy network in the event of failure of a network or a converter (3, 5).

A switching ratio (k) is supplied to the two-quadrant converter (8) as an electronically generated, rapidly variable manipulated variable. The two-quadrant converter (8) can be regarded as a d.c. voltage transformer having an electronically adjustable transformation ratio (k).

It holds during charging of the magnetic memory (L) that: $k = t_{on}/T_0$, and during discharging of the magnetic memory (L) that: $k = t_{off}/T_0$, where $t_{on}$: cyclic time of charge, free-wheeling time of discharge, $t_{off}$: cyclic time of discharge, free-running time of charge, and $T_0$: period of operation cycle ($T_0 = T_{ton} + t_{off}$), cf., for example, FIG. 4a).

The pulse frequency $f = 1/T_0$ of the two-quadrant converter (8) is yielded by an economic optimization, it being necessary to consider the switching losses of the two-quadrant converter (8) on the one hand and the still acceptable resultant d.c. ripple (harmonics), on the other hand.

Figure 2:
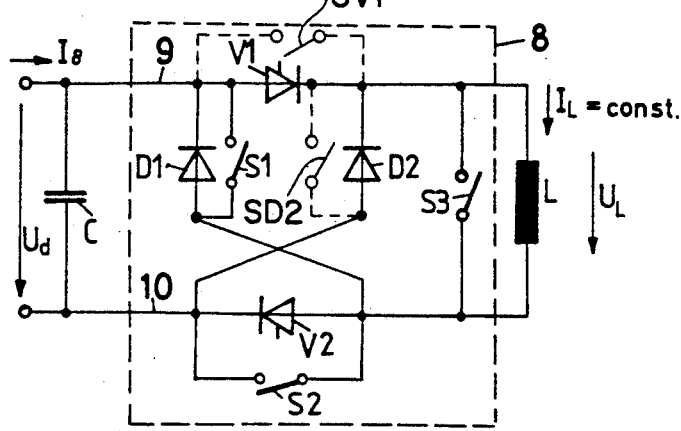
FIG. 2 shows a circuit diagram of a two-quadrant converter in accordance with FIG. 1, having three mechanical switches in addition to four semiconductor valves, connected to an indirect capacitor and the magnetic memory.

FIG. 2 shows a two-quadrant converter (8) having a 1st controllable valve or thyristor (V1) in a 1st d.c. line (9), whose cathode is connected via the magnetic memory (L) to the anode of a 2nd controllable valve or thyristor (V2) in a 2nd d.c. line (10). The intermediate circuit voltage ($U_d$) of the indirect capacitor (C) is applied to the d.c. lines (9) and (10). The anode of the thyristor (V2) is connected to the anode of a diode (D1) whose cathode is connected to the anode of the thyristor (V1). The cathode of the thyristor (V2) is connected to the anode of a diode (D2) whose cathode is connected to the cathode of the thyristor (V1). Mechanical switches (S1) (or SD2) and (S2) SV1 and (S3) are respectively provided in parallel branches to the diode (D1), (or D2), the thyristor (V2) or the thyristor (V1) and the magnetic memory (L).

The voltage design of the semiconductor valves (V1, V2, D1, D2) results from the intermediate circuit voltage ($U_d$), which the optimization of the converters (3, 5).

The current design of the turn-off valves (V1, V2) results from the maximum current ($I_{Lmax}$) of the superconducting magnet (L) and the maximum value of the switching ratio (k) during charging or from the minimum value thereof during discharging.

The current design of the diodes (D1, D2) results from this maximum current ($I_{Lmax}$) of the superconducting magnet (L) and the minimum value of the switching ratio (k) during charging or from the maximum value thereof during discharging.

3 variant embodiments are described below which differ from one another in the following features:

Number of semiconductor valves, additional mechanical switching elements,

Current design of the semiconductor valves,

Losses in the two-quadrant converter (8), and dynamic switchover characteristics during charging - discharging.

Variant 1

Figure 3A:
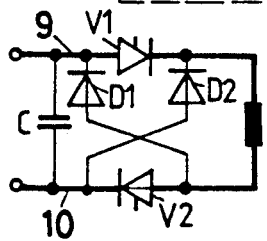
FIGS. 3a–3c show operating states of a two-quadrant converter in accordance with FIG. 2, but without mechanical switches, FIGS. 4a)–4i) show signal diagrams of the turn-on times and turn-off times of the semiconductor valves in the operating states in accordance with FIGS. 3a–3c, FIGS. 5a–5d show signal diagrams intended to explain the mean values of voltage and current during charging and discharging of the magnetic memory in the operating states in accordance with FIGS. 3a–3c, FIGS. 6a–6d show operating states of a two-quadrant converter having only one additional mechanical switch for the charging or discharging process, FIGS. 7a)–7j) show signal diagrams of the turn-on times and turn-off times of the semiconductor valves in the operating states in accordance with FIGS. 6a–6d, FIGS. 8a–8g show operating states of a two-quadrant converter having only two semiconductor valves.
Figure 3B:
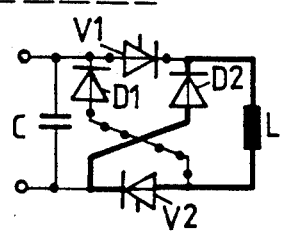
Figure 3C:
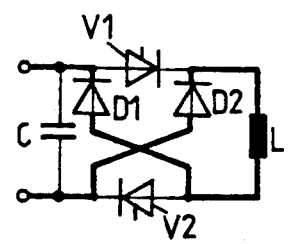

The associated circuit follows from FIGS. 3a-3c, which corresponds to that of FIG. 2, the mechanical switches (S1-S3) being omitted, however. Self-commutated thyristors or turn-off GTO thyristors (V1, V2), which have a disabling capability but no blocking capability.

During the charging interval of the magnetic memory (L), the two thyristors (V1, V2) are conducting, cf. FIG. 3a. During the discharge interval, the two thyristors (V1, V2) are non-conducting, and the two diodes (D1, D2) are conducting, cf. FIG. 3c. By switching off one thyristor (V1) or (V2) during charging, or by triggering one thyristor during discharging, a freewheel for the magnetic memory ($I_L$) is connected in an alternating cyclic fashion, cf. FIG. 3b. It is important that the freewheel is controlled alternately via D1-V1 and via V2-D2. The transition from charging to discharging and vice versa is possible at any time and without delay.

Figure 4:
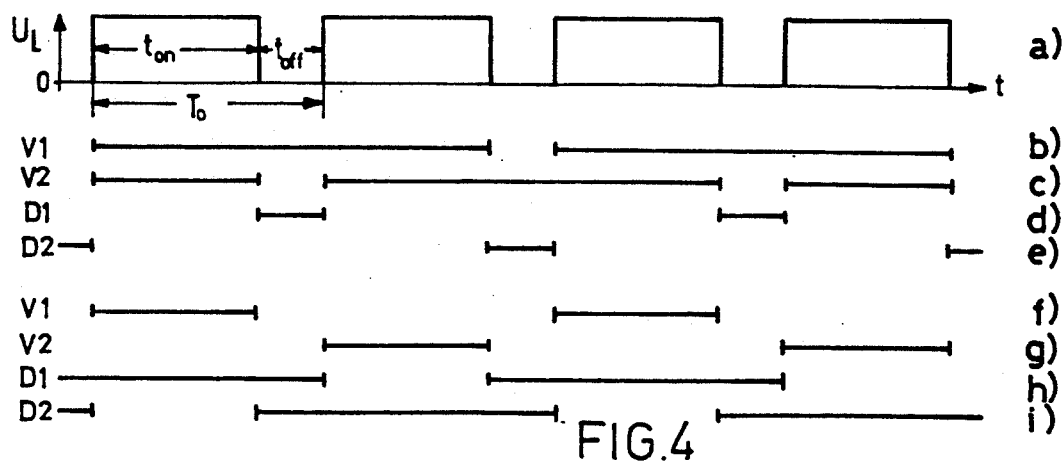
Figure 9A:
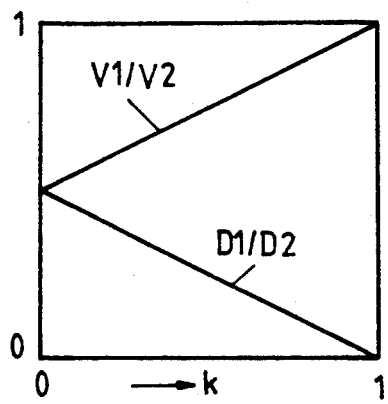
FIGS. 9a and 9b show signal diagrams of the valve loads during charging or discharging of the magnetic memory in the operating states in accordance with FIGS. 3a–3c, in accordance with a first variant embodiment.
Figure 9B:
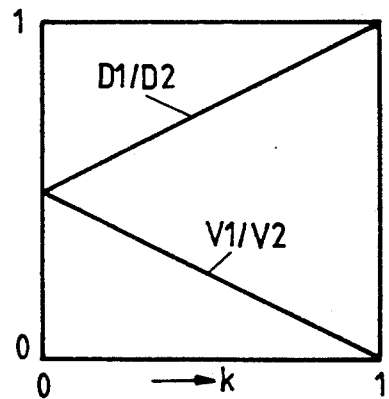

The relative current load on the valves, referred to a permanent line, corresponding to the maximum current ($I_{Lmax}$), may be seen from FIGS. 4a)-4i) and FIGS. 9a and 9b. The switching rate of the valves, and thus their switching losses, are half as large as the outwardly effective pulse frequency.

In FIG. 4a), the voltage drop ($U_L$) at the magnetic memory (L) is plotted on the ordinate, and the time (t) is plotted on the abscissa. The ON period of the valves (V1), (V2), (D1) and (D2) during charging of the magnetic memory (L) is represented in FIGS. 4b) to 4e). It is seen therefrom that each valve is switched only during each 2nd pulse cycle in accordance with FIG. 4a). The diodes (D1) and (D2) conduct current alternately during the free-wheeling times of charge ($t_{off}$).

The ON period of the four valves (V1, V2, D1, D2) during discharging of the magnetic memory (L) is represented in FIGS. 4f) to 4i), the discharging taking place during the time of discharge ($t_{off}$) in accordance with FIG. 4a). Here, by contrast with the charging process in accordance with FIG. 4a), the voltage ($U_L$) at the magnetic memory (L) is equal to zero during the free-wheeling time of charge ($t_{on}$), and to $-U_L$ during ($t_{off}$), cf. FIG. 7f). During discharging as well, each valve is changed from the non-conducting into the conducting state, and vice versa, only during each 2nd operation cycle.

Figures 5A, 5B, 5C, 5D:
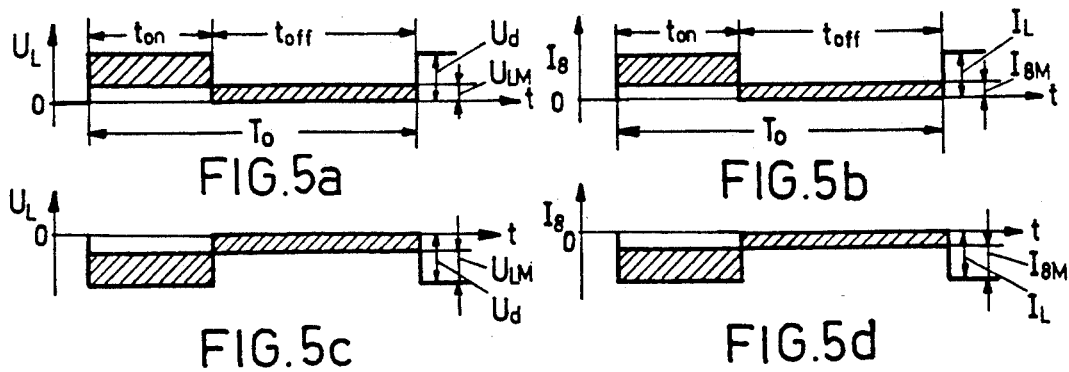

For the charging operation of the magnetic memory (L), the voltage ($U_L$) dropping at it is plotted in FIG. 5a, and the current ($I_8$) through the two quadrant converter (8) in FIG. 5b as a function of time (t). The hatched areas mark equal voltage or current mean values ($U_{LM}$, $I_{8M}$) during ($t_{on}$) and ($t_{off}$), respectively. Corresponding signal diagrams for the discharging operation of the magnetic memory (L) are represented in FIGS. 5c and 5d.

It holds for the charging operation that:

$U_{LM} = t_{on} \cdot U_d / T_0,$ $I_{SM} = t_{on} \cdot I_L / T_0$ and $P_{8M} = U_d \cdot I_{8M} = U_d \cdot t_{on} \cdot I_L / T_0,$ where $P_{8M}$ signifies the mean value of the transmitted power. The corresponding values for the discharging operation are obtained by substituting $-t_{off}$ for $t_{on}$.

A mechanical by-pass switch (S3) to the magnetic memory (L) can be provided as an option in accordance with FIG. 2. This by-pass switch (S3) is particularly advantageous if the two-quadrant converter (8) is to remain in active standby operation over lengthy periods (hours), the magnetic memory (L) being in a charged state, but not to be charged or discharged. When the by-pass switch (S3) is closed, it must be ensured that both controllable valves (V1, V2) are not triggered or conducting.

Variant 1 is dynamically optimum because of the half switching rate of the valves. 4 semiconductor valves are required, of which there are always 2 in the current path.

Variant 2

Figures 6A, 6B, 6C, 6D:
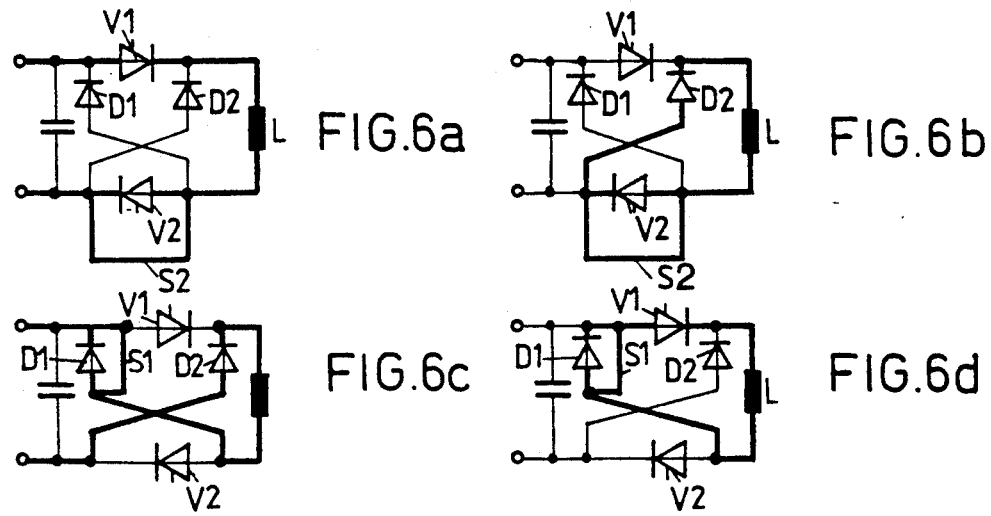

By contrast with Variant 1, in addition to a turn-off valve and a diode valve (V2, D1) mechanical short-circuiting switches (S1, S2) are connected in parallel in the two-quadrant converter (8), cf. FIGS. 6a–6b.

Figure 7:
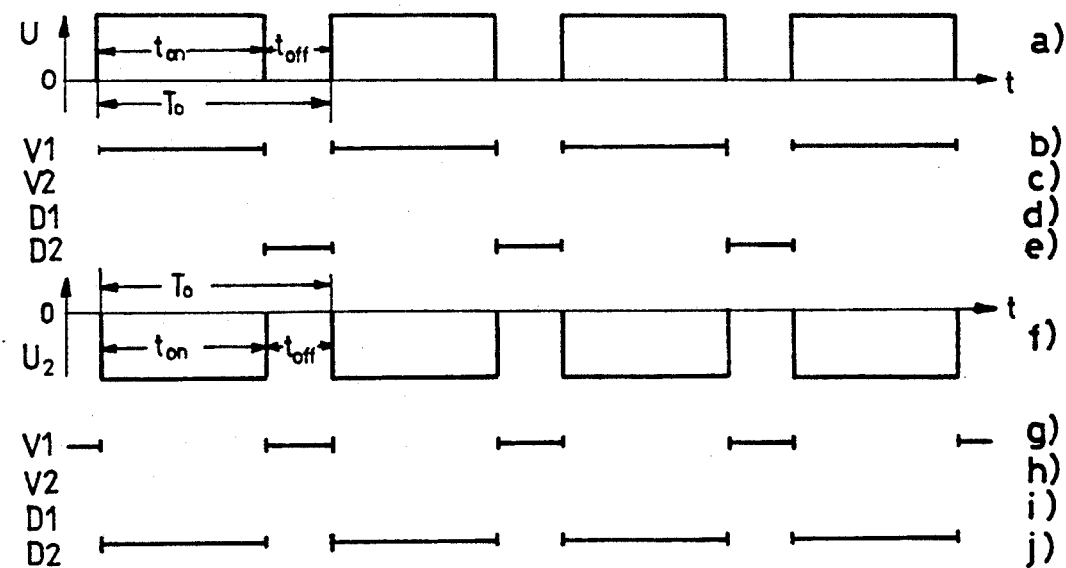

FIGS. 6a and 6b show the current flow during charging of the magnetic memory (L), in accordance with the charging cycle represented in FIG. 7a. All that is required here is the mechanical switch (S2), parallel to the valve (V2), which because of its lower line resistance takes over the overwhelming proportion of the charging current or free-wheeling current, and thus unloads the valve (V2). The relative current load on the 4 semiconductor valves (V1, V2, D1, D2) is to be seen from FIGS. 7b) to 7e).

The discharging of the magnetic memory (L) could take place in principle in accordance with variant 1. The mechanical switch (S1), provided in accordance with the circuits of FIGS. 6c and 6d, parallel to the diode (D1) unloads the latter during the discharging process, the current flow of which is to be seen from FIG. 6c. FIG. 6d shows the associated free-wheeling current during ($t_{on}$), in accordance with the discharging cycle represented in FIGS. 7f). The relative current load on the semiconductor valves (V1, V2, D1, D2) is represented in FIGS. 7g) to 7j). This discharging cycle could also be combined in principle with the charging cycle of variant 1.

Variant 2 has the advantage that virtually only 1 semiconductor valve is current-carrying in each case. Both during charging and during discharging, these are successively the valves (V1) and (D2). The turn-off valve (V2) and the diode (D1) can be dimensioned substantially weaker in terms of current, since they must carry current only in traditional states, i.e. approx. 100 ms, depending upon the quality of the mechanical switches.

As in Variant 1, a mechanical bypass switch (S3) can be provided in parallel with the magnetic memory (L).

Variant 3

The associated circuit is to be seen from FIGS. 8a to 8g. Only one turn-off semiconductor valve (V1) and one diode (D2) are required. The losses in the two-quadrant converter (8) are minimal.

Figure 8A:
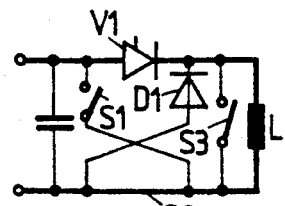
Figure 8B:
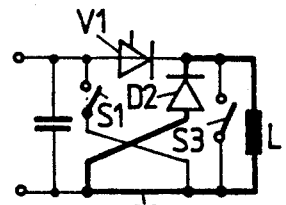
Figure 8C:
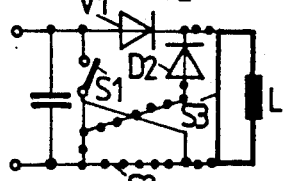
Figure 8D:
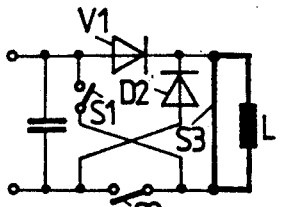
Figure 8E:
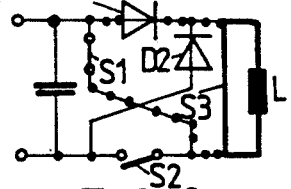
Figure 8F:
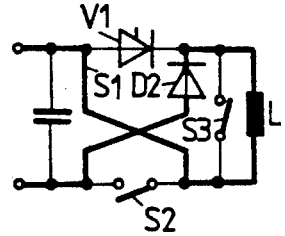
Figure 8G:
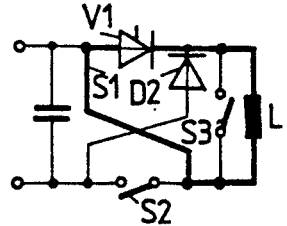

The current flow during charging of the magnetic memory (L) is represented in FIGS. 8a and 8b, that during discharging in FIGS. 8f and 8g. The switchover from charging operation to discharging operation takes place successively in accordance with the circuit states represented in FIGS. 8c to 8e. The switchover from the discharging operation to charging operation takes place successively via the states in accordance with FIGS. 8e, 8d and 8c.

Figure 10A:
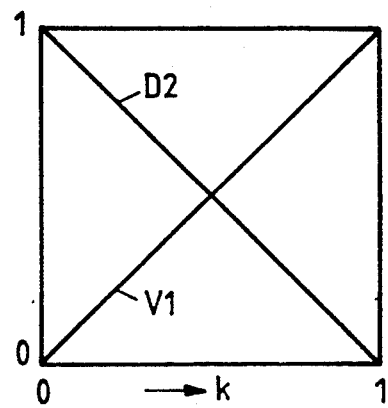
FIGS. 10a and 10b show signal diagrams of the valve loads during charging or discharging of the magnetic memory in the operating states in accordance with FIGS. 6a–6d and FIGS. 8a–8g, in accordance with a second and third variant embodiment.
Figure 10B:
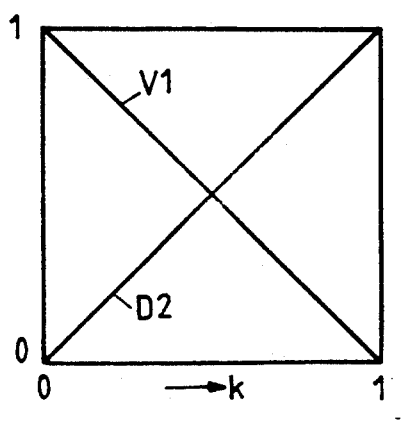

The relative current load on the semiconductor valves (V1, D2) during charging is represented in FIG. 10a, and during discharging in FIG. 10b. The current load is plotted on the ordinate, the numeral 1 corresponding to a load of 100%. The switching ratio (k) is plotted on the abscissa. The same load relationships hold for Variant 2.

For Variant 1, the current load during charging is represented in FIG. 9a, and during discharging in FIG. 9b. The ordinate and abscissa designations are the same as for FIG. 10a.

It goes without saying that the semiconductor valves (V1) and (D2) can be replaced in Variant 3 by mechanical switches, it then being the case that semiconductor valves (D1) and (V2) are to be provided instead of the mechanical switches (S1) and (S2).

A corresponding statement holds for Variant 2. Instead of mechanical switches (S1) and (S2) in parallel with the valves (D1) and (V2), mechanical switches could be provided in parallel with the valves (V1) and (D2).

In the network connection represented in FIG. 1, the converter (3) can have two antiparallel, 12-pulse thyristor converters in a circulating-current-free circuit. This is particularly advantageous if the intermediate circuit voltage ($U_d$) has to be kept constant and unipolar, and a rapid power reversal is required of the traction system (7).

It is now possible by means of the two-quadrant converter (8) to achieve this power reversal at the converter (3) by applying the intermediate circuit voltage ($U_d$), reversed in terms of potential, to the terminals of said converter. This polarity reversal can take place in the de-energized state of the converter (3) by means of conventional motorised isolators. The outlay on components for the converter (3) can be halved by means of these measures. The power intermission arising thereby on the side of the national grid (1) can be bridged by the two-quadrant converter (8), so that no disadvantageous power intermission is perceptible for the traction system (7).

Furthermore, two-quadrant converters (8) having an energy storage magnet (L) can advantageously be used in so-called UPS installations for the purpose of uninterrupted power supply. Short-term power failures and voltage dips, such as occur, for example, in an hourly cycle during simultaneous start-up of electrical traction vehicles, can be bridged or balanced by discharging the magnetic memory (L).

The method using alternating free-wheeling in accordance with Variant 1 can also be advantageously applied in Variant 2.

Obviously, numerous modifications and variations of the present invention are possible in light of the above teachings. It is therefore to be understood that within the scope of the appended claims, the invention may be practiced otherwise then as specifically described here.

What is claimed as new and desired to be secured by Letters Patent of the United States is:

1. A two-quadrant converter, which is actively connected to at least one magnetic memory, comprising:
   a) at least a 1st controllable switching element in a 1st d.c. line being actively connected via the at least one magnetic memory to at least a 2nd controllable switching element in a 2nd d.c. line,
   b) the at least one 2nd controllable switching element having a side, actively connected to the at least one magnetic memory and being connected via a 3rd valve to a side of the 1st switching element which is not actively connected to the at least one magnetic memory,
   c) the at least one 2nd controllable switching element having another side, not actively connected to the at least one magnetic memory and being connected via a 4th valve to another side of the 1st switching element which is actively connected to the at least one magnetic memory, and
   d) the 1st and 2nd controllable switching elements being semiconductor valves, wherein
   e) a controllable mechanical switching element is connected in parallel to at least one of the controllable semiconductor valves.

2. The two-quadrant converter as claimed in claim 1,
   a) the 3rd and 4th valves being semiconductor valves, wherein
   b) a controllable mechanical switching element is connected in parallel to at least one of the two 3rd or 4th valves.

3. The two-quadrant converter as claimed in claim 1, wherein a further mechanical switching element is connected directly in parallel to the at least one magnetic memory.

4. The two-quadrant converter as claimed in claim 1, wherein the 3rd or 4th valve is a controllable mechanical switching element.

5. The two-quadrant converter as claimed in claim 4, wherein a further mechanical switching element is connected directly in parallel to the at least one magnetic memory.

6. A two-quadrant converter as claimed in claim 1 further comprising a connection to stabilize output transmission upon line coupling, the connection of the two-quadrant converter with the magnetic memory being connected to an intermediate d.c. circuit of a converter of the line coupling, the line coupling having at least one line-commutated converter and at least one self-commutated converter.

7. A two-quadrant converter, which is actively connected to at least one magnetic memory, comprising:
   a) at least a 1st controllable switching element in a 1st d.c. line being actively connected via the at least one magnetic memory to at least a 2nd controllable switching element in a 2nd d.c. line,
   b) the at least one 2nd controllable switching element having a side, actively connected to the at least one magnetic memory, and being connected via a 3rd valve to a side of the 1st switching element which is not actively connected to the at least one magnetic memory,
   c) the at least one 2nd controllable switching element having another side, not actively connected to the at least one magnetic memory and being connected via a 4th valve to another side of the 1st switching element which is actively connected to the at least one magnetic memory, and
   d) the 3rd and 4th valves being semiconductor valves, wherein
   e) a controllable mechanical switching element is connected in parallel to at least one of the two 3rd and 4th valves.

8. The two-quadrant converter as claimed in claim 7,
   a) the 1st and 2nd controllable switching elements being controllable semiconductor valves, wherein
   b) a controllable mechanical switching element is connected in parallel to at least one of the controllable semiconductor valves.

9. The two-quadrant converter as claimed in claim 7, wherein the 3rd or 4th valve is a controllable mechanical switching element.

10. The two-quadrant converter as claimed in claim 7, wherein a further mechanical switching element is connected directly in parallel to the at least one magnetic memory.

11. Method of operating a two-quadrant converter which is actively connected to a magnetic memory, comprising the steps of:
   a) actively connecting at least a 1st controllable switching element in a 1st d.c. line via the at least one magnetic memory to at least a 2nd controllable switching element in a 2nd d.c. line,
   b) connecting a side of the at least one 2nd controllable switching element to the at least one magnetic memory and, via a 3rd valve, to a side of the 1st switching element which is not actively connected to the at least one magnetic memory,
   c) connecting another side of the at least one 2nd controllable switching element to the at least one magnetic memory and, via a 4th valve, to another side of the 1st switching element which is actively connected to the at least one magnetic memory, wherein
   d) the 1st or 2nd controllable switching element includes a controllable mechanical switching element.

* * * * *